United States Patent
Klose

[15] 3,675,520
[45] July 11, 1972

[54] TIRE AWLING APPARATUS

[72] Inventor: Karl W. Klose, Findlay, Ohio

[73] Assignee: Cooper Tire & Rubber Company, Findlay, Ohio

[22] Filed: Jan. 28, 1970

[21] Appl. No.: 6,455

[52] U.S. Cl. ..................... 83/2, 83/169, 83/660, 157/13
[51] Int. Cl. ........................................ B26f 1/34
[58] Field of Search ................ 83/2, 22, 30, 169, 660; 157/13; 156/87

[56] References Cited

UNITED STATES PATENTS

| | | | |
|---|---|---|---|
| 3,154,985 | 11/1964 | Hermanns | 83/2 |
| 3,128,579 | 4/1964 | Kehoe et al. | 157/13 X |
| 3,107,565 | 10/1963 | Hermanns | 83/2 |
| 3,389,626 | 6/1968 | Wise | 83/2 |
| 2,561,012 | 7/1951 | Clark | 83/2 UX |

Primary Examiner—James M. Meister
Attorney—Baldwin, Egan; Walling & Fetzer

[57] ABSTRACT

An apparatus for automatically awling tires to permit easy escape of trapped gases which may have been enclosed or developed interiorly of the casing during manufacture or result from permeation from the inner chamber through the tubeless liner during the life of the tire. The apparatus automatically advances and centers a tire on the apparatus, after which it is vertically positioned and inflated preparatory to awling. After inflation, the apparatus automatically awls both sides of the tire simultaneously in a plurality of locations, after which the tire is deflated and ejected from the apparatus.

3 Claims, 9 Drawing Figures

INVENTOR
KARL W. KLOSE
Baldwin, Egan, Walling & Fetzer
ATTORNEYS

TIRE AWLING APPARATUS

This invention relates to tire awling apparatus, and more particularly to such an apparatus that automatically awls tires on both sides thereof in a plurality of locations.

During the manufacture of pneumatic tires, pockets of air often become trapped between the plies or permeate through the liner. In service, there is constant migration or permeation of inflating air through the liner. Such air may accumulate in pockets within the tire casing and coupled with the dynamic stresses engendered during running, will lead ultimately to destruction of the tire. Due to modern high speed operation, this condition is particularly troublesome at the tread, where the forces of centrifugal force and trapped air pressure are directly additive.

Separations caused by air permeating through the liner and unable to escape through the side wall or the tread area of a tire can be reduced by carcass venting. The art of venting has been practiced for quite some time. It is generally performed by hand and is also known as hand awling. Inconsistencies associated with hand awling, such as improper penetration of the awling needle, awling in areas not specified, etc., are undesirable and can lead to separations.

Therefore, it is an object of the invention to provide an apparatus for automatically and positively awling both sides of a tire simultaneously at a plurality of locations consistently and at the proper depth. It is not necessary for the awl to strike each air pocket. It is only necessary to provide air egress perforations at a number of places around the periphery and the entrapped air will migrate to these points.

A further object of the invention is to provide an awling machine of the above type that is simple in construction, inexpensive to manufacture, and highly effective in operation.

Briefly, the foregoing objects are accomplished by the provision of an apparatus for automatically awling tires to relieve any air pressure in the tire structure. The apparatus includes a base, a pair of spaced upstanding columns extending upwardly from said base, and an inclined tire roller conveyor system disposed between and secured to said columns intermediate the ends thereof including a gravity feed conveyor and a power-driven discharge conveyor for feeding and discharging tires from the apparatus in preselected sequence. A pair of spaced coacting hydraulically controlled single tire release gate arms are disposed at the sides of the feed conveyor and are configured and adapted to retain and release one tire at a time on such feed conveyor, such release gates being horizontally rotatable in coacting timed sequence to and from a position over the feed conveyor to retain and release one tire at a time thereon in preselected sequence, whereby a released tire rolls down the feed conveyor by gravity to the inner end of such feed conveyor. Two pair of oppositely and horizontally spaced centering rollers are disposed adjacent the sides of the inner end of the feed conveyor and are movably mounted for displacement toward and away from each other to center a tire therebetween on the apparatus. A stationary upper tire bead ring is secured to and interposed between the spaced columns above the conveyor system. A vertically movable lower bead ring is disposed below the tire when it is in centered position at the inner end of the feed conveyor, such lower bead ring being movable vertically so as to lift the tire and clamp it against the upper bead ring in sealing relation preparatory to inflation.

A vertically disposed lock shaft extends centrally through the upper bead ring, such lock shaft having a lock key secured to its lower end. The lower bead ring includes a lower bead ring support having an annular groove for receiving the lock key in locking relation therein when the lower bead ring is raised to clamp the tire against the upper bead ring, thereby locking the upper and lower bead rings in predetermined spaced relation with the tire therebetween. The lock shaft has an air passageway formed longitudinally therein with the inner end of the passageway opening into the interior of the tire when it is clamped between the bead rings, and the other end of the passageway is connected to an associated source of compressed air to inflate the tire.

A plurality of individual hydraulically actuated awling mechanism are disposed in spaced operative relation on the periphery of both bead rings for awling both sides of the tire to a predetermined depth when the tire is inflated. A pair of spaced coacting hydraulically controlled rear stop gate arms are disposed at the sides of the discharge conveyor adjacent the inner end thereof, such rear stop gate arms being horizontally rotatable in coacting timed sequence to and from a position adjacent the inner end of the discharge conveyor to retain a tire thereat as it is received from the feed conveyor.

Thus, there is provided an apparatus that automatically awls both sides of a tire simultaneously at a plurality of locations. The area of chance is eliminated with the present invention by assuring accurate awling consistently and automatically.

Other objects and advantages of the invention will be apparent from the following description taken in conjunction with the drawings wherein.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

Figures 1, 1A:
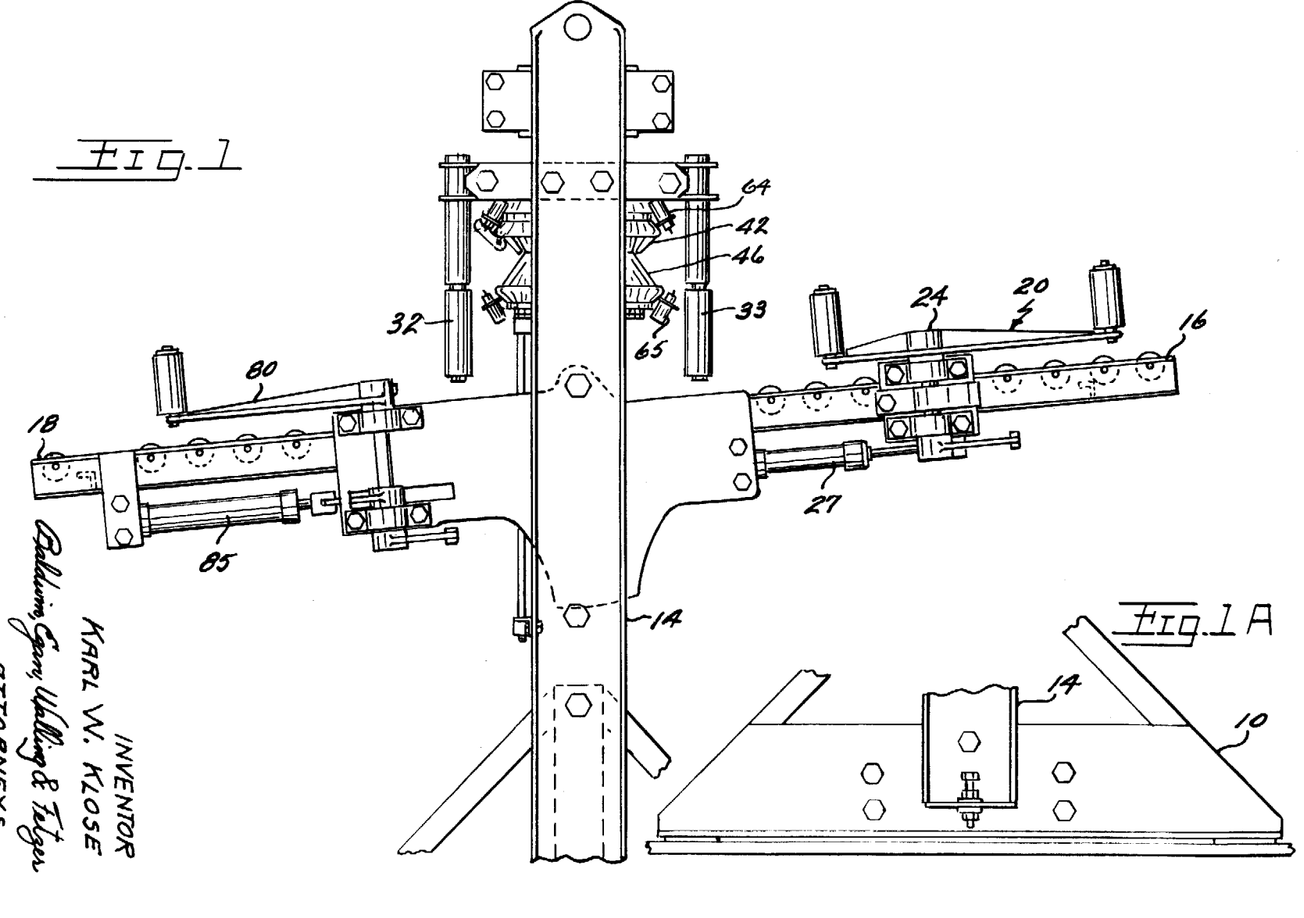
FIG. 1 is a side elevational view of an automatic tire awling apparatus constructed in accordance with the invention.
FIG. 1A is a side elevational view of the base of the apparatus shown in FIG. 1.
Figure 2:
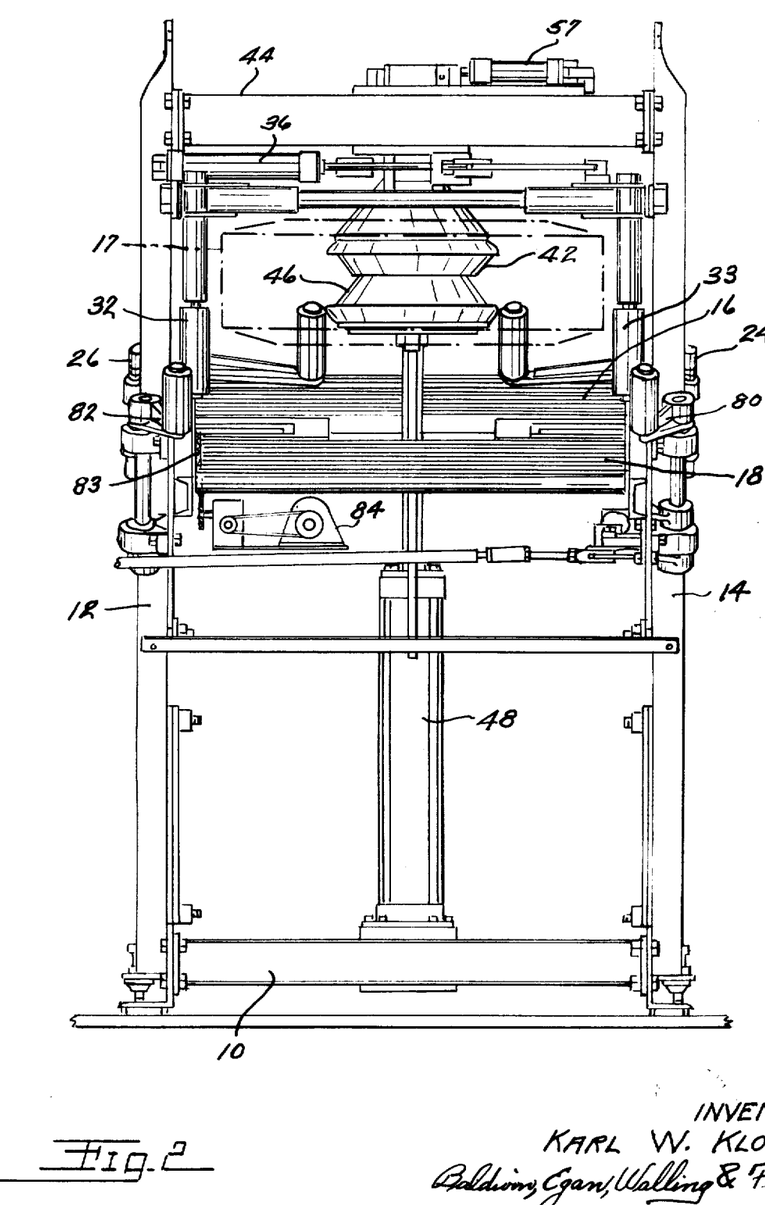
FIG. 2 is a left end elevational view of the apparatus shown in FIG. 1.
Figure 3:
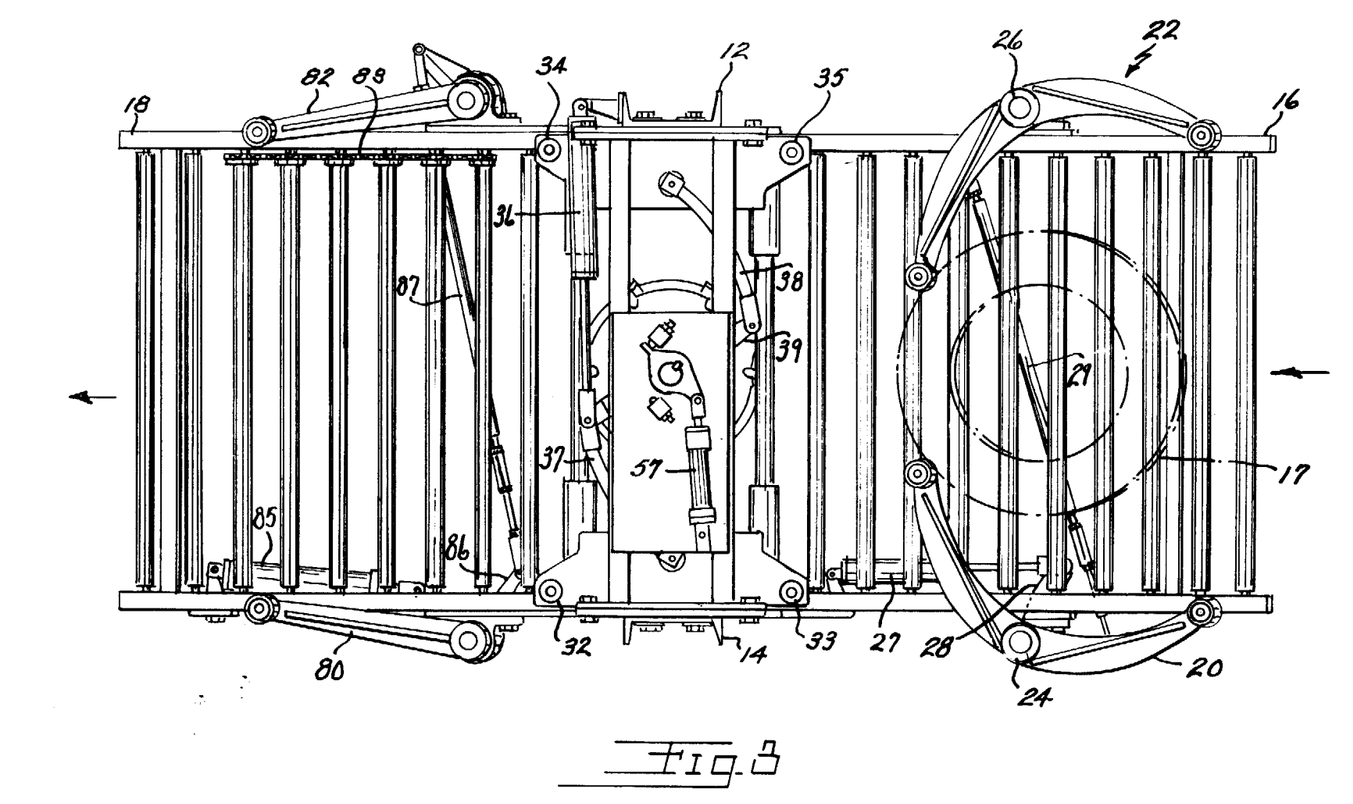
FIG. 3 is a top plan view of the apparatus shown in FIG. 1.

Referring first to FIGS. 1, 2 and 3, there is shown an apparatus for automatically awling tires constructed in accordance with the invention and including a base 10, a pair of spaced upstanding columns 12 and 14 extending upwardly from the base, and an inclined, gravity-type tire roller conveyor system disposed between and secured to the columns 12 and 14 intermediate the ends thereof including a feed conveyor 16 and a power driven discharge conveyor 18 for discharging tires from the apparatus in preselected sequence, as will be hereinafter explained.

A pair of spaced, coacting, hydraulically controlled single tire release gate arms 20 and 22 are disposed at the sides of the feed conveyor 16 and are configured and adapted to retain and release one tire 17 at a time on such feed conveyor. The release gates 20, 22 are horizontally rotatable about the points 24, 26, respectively, in coacting timed sequence to and from a position over the feed conveyor 16 to retain and release one tire at a time thereon in preselected sequence, whereby a released tire rolls down the feed conveyor by gravity to the inner end of such feed conveyor. The release gates 20, 22 are operated in unison by the piston-cylinder mechanism 27 in conjunction with the coacting levers 28 and 29 as shown in FIG. 3.

Two pair of oppositely and horizontally spaced centering rollers consisting of paired rollers 32, 33 and paired rollers 34, 35 are disposed adjacent the sides of the inner end of the feed conveyor 16 and movably mounted for displacement toward and away from each other to center a tire therebetween. The paired rollers are actuated by the piston-cylinder mechanism 36 in conjunction with the coacting levers 37, 38 and 39 as shown (FIG. 3).

A stationary upper tire bead ring 42 is secured to and is interposed between the spaced columns 14 and 12 above the conveyor system and is secured to such columns through the cross beam 44.

A vertically movable lower bead ring 46 is disposed below the tire 17 when such tire is in position at the inner and of the feed conveyor 16. The lower bead ring 46 is movable vertically upward so as to lift the tire 17 and clamp it against the upper bead ring 42 (as shown in FIG. 2) preparatory to inflation. The lower bead ring 46 is actuated by the piston-cylinder mechanism 48 as shown (FIG. 2).

Figure 4:
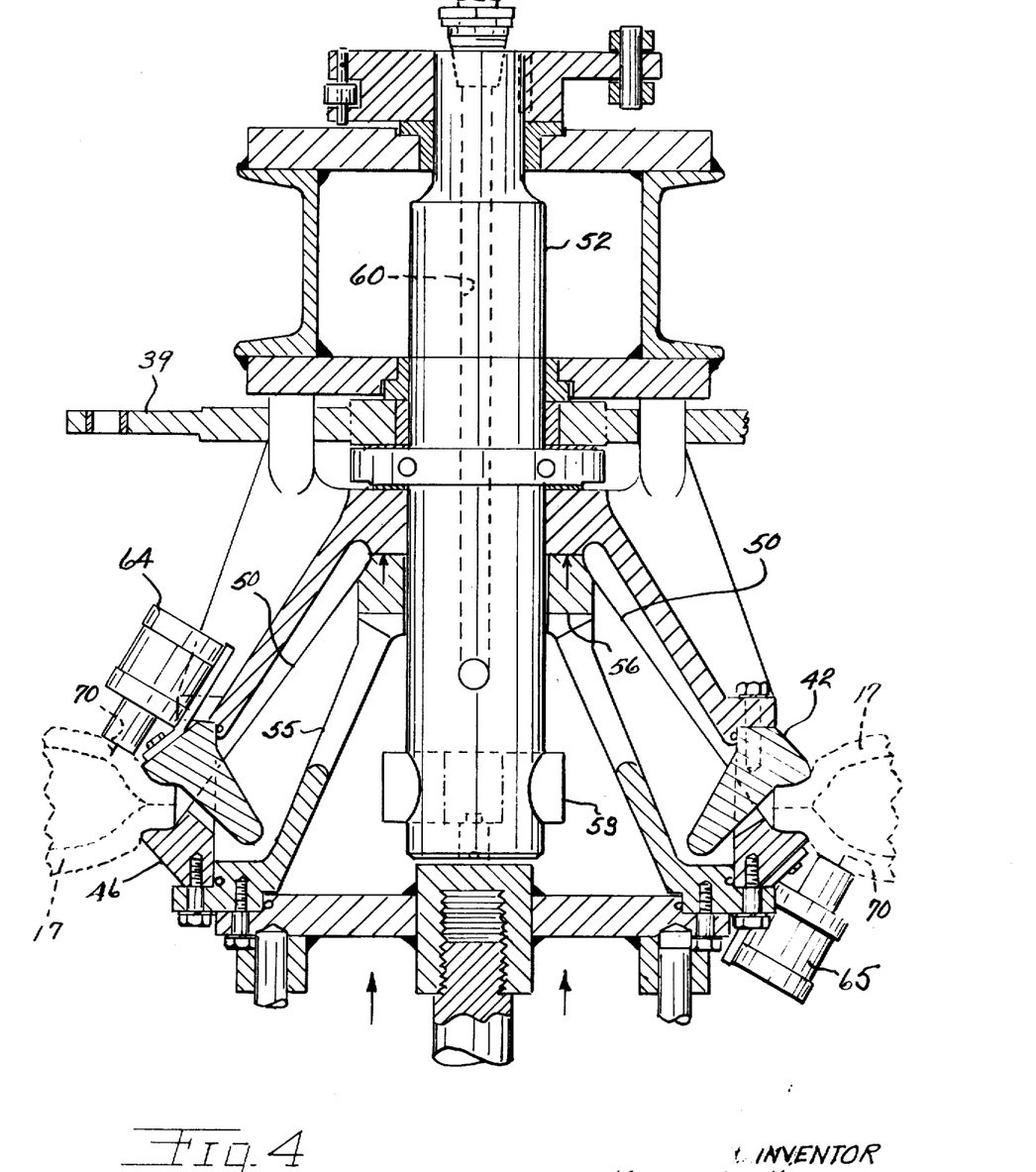
FIG. 4 is an enlarged sectional view of the upper and lower bead rings of the apparatus of FIG. 1, such bead rings being shown in disengaged position.

A vertically disposed lock shaft 52 (FIGS. 4 and 5) extends centrally through the upper bead ring 42, such lock shaft having a lock key 53 secured to its lower end. The lower bead ring 46 includes a lower bead ring support 55 having an annular groove 56 for receiving the lock key 53 in locking relation therein when the lower bead ring is raised to clamp the tire 17 against the upper bead ring thereby locking the upper and lower bead rings in predetermined spaced relation with the tire 17 therebetween. Such locking is effected by rotating the lock shaft a quarter of a turn to lock the key in the groove 56, such shaft rotation being effected by the lock cylinder 57 as shown in FIG. 3.

The lock shaft 52 has an air passageway 60 formed longitudinally therethrough with the inner end of the passageway opening into the interior of the tire 17 when it is clamped between the upper and lower bead rings 42, 46 and the other end of the passageway is connected to an associated source of compressed air (not shown) to inflate the tire.

Figures 5, 6:
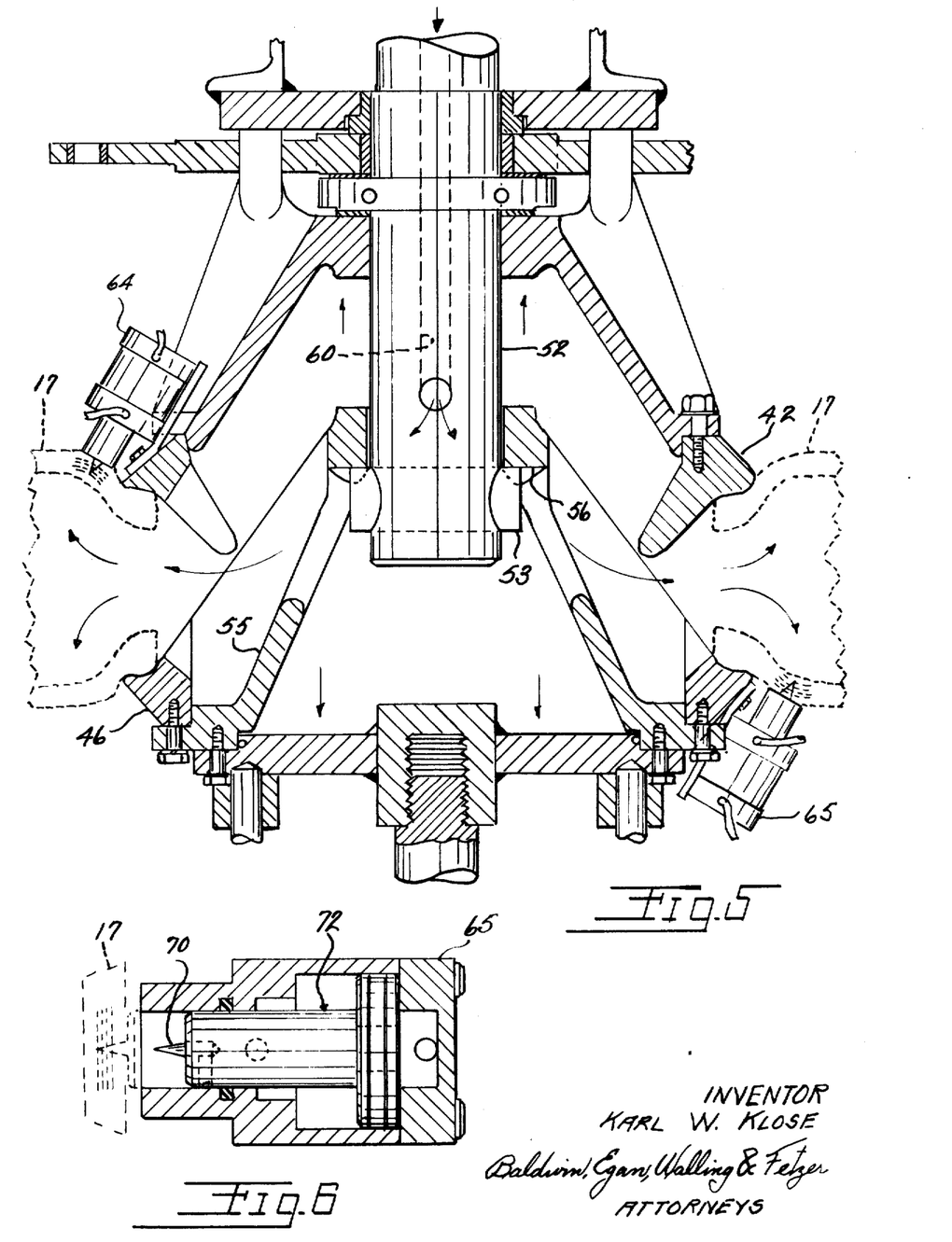
FIG. 5 is a view similar to FIG. 4, but showing the bead rings in locked position for effecting tire inflation.
FIG. 6 is a side elevational view of one of the awling mechanisms shown in FIG. 5.

A plurality of hydraulically actuated awling mechanisms 64, 65, etc., are disposed in spaced operative relation on the periphery of the bead rings, as shown, for awling the sides of the tire 17 to a predetermined depth after the tire is inflated. As shown in FIG. 6, each awling mechanism including an awling needle 70 mounted on a piston 72 of a piston-cylinder mechanism. The needle may be adjustable for depth penetration.

A pair of spaced, coacting, hydraulically controlled rear stop gate arms 80, 82 are disposed at the sides of the discharge conveyor 18 adjacent the inner end thereof, such rear stop gate arms being horizontally rotatable in coacting timed sequence to and from a position adjacent the inner end of the discharge convey or to retain a tire thereat as it is received from the feed conveyor in preparation for centering. The rear stop gate arms 80, 82 are actuated by the piston-cylinder mechanism 85 in conjunction with the coacting levers 86 and 87 as shown in FIG. 3. To effect quick discharge of the tire from the apparatus, certain rollers of the discharge conveyor are rotated by the chain drive 83 which is driven by a suitable driving means 84.

Figure 7:
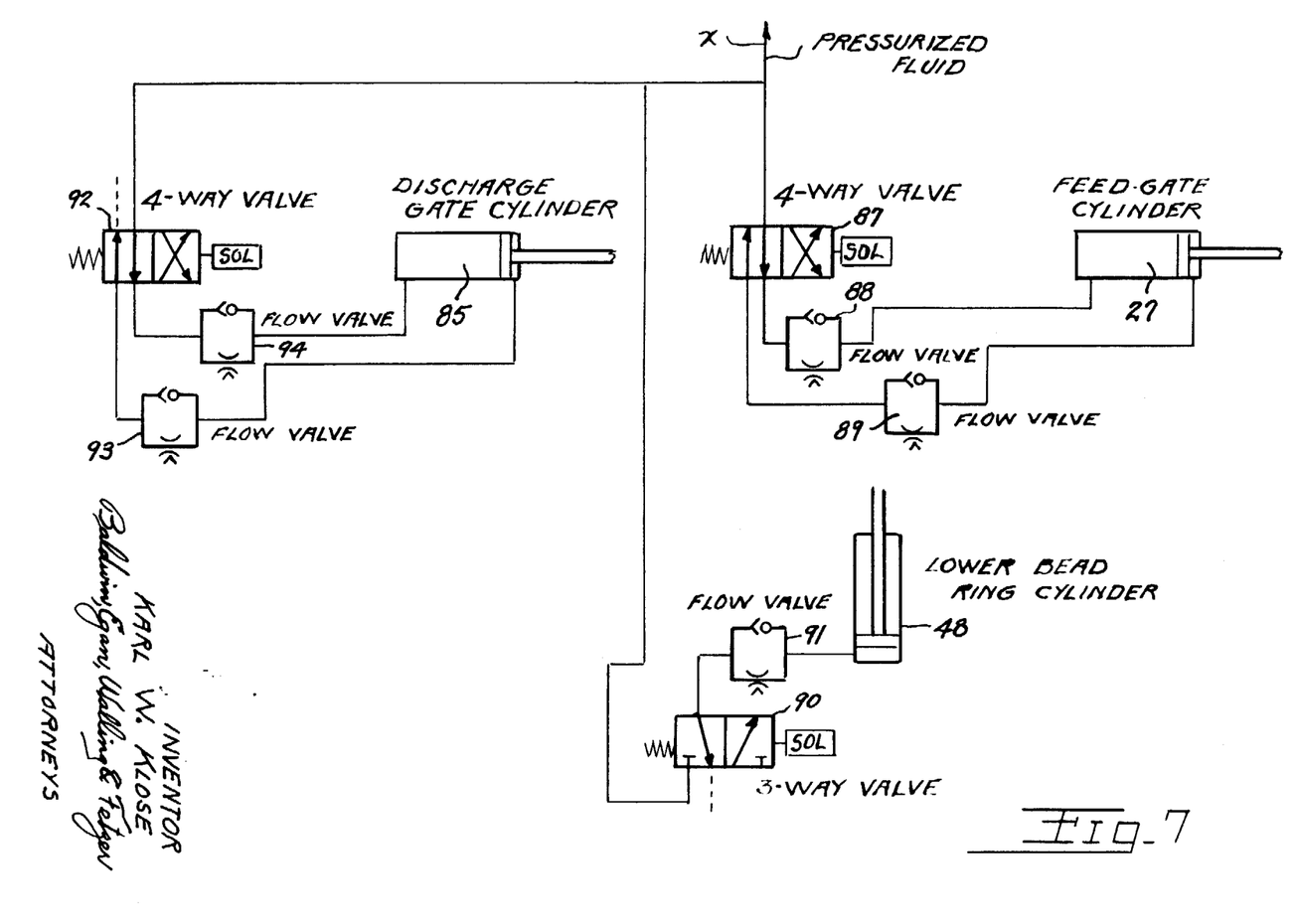
FIG. 7 is a schematic diagram of the tire inflation and awling control mechanisms of the apparatus of FIG. 1.

In FIG. 7, pressurized fluid is introduced into the system at point "X". The feed gate cylinder 27 is controlled by the four-way valve 87 and the flow control valves 88, 89. The lower bead ring cylinder 48 is controlled by the three-way valve 90 and the flow control valve 91, and the discharge gate cylinder 85 is controlled by the four-way valve 92 and the flow control valves 93, 94.

Figure 8:
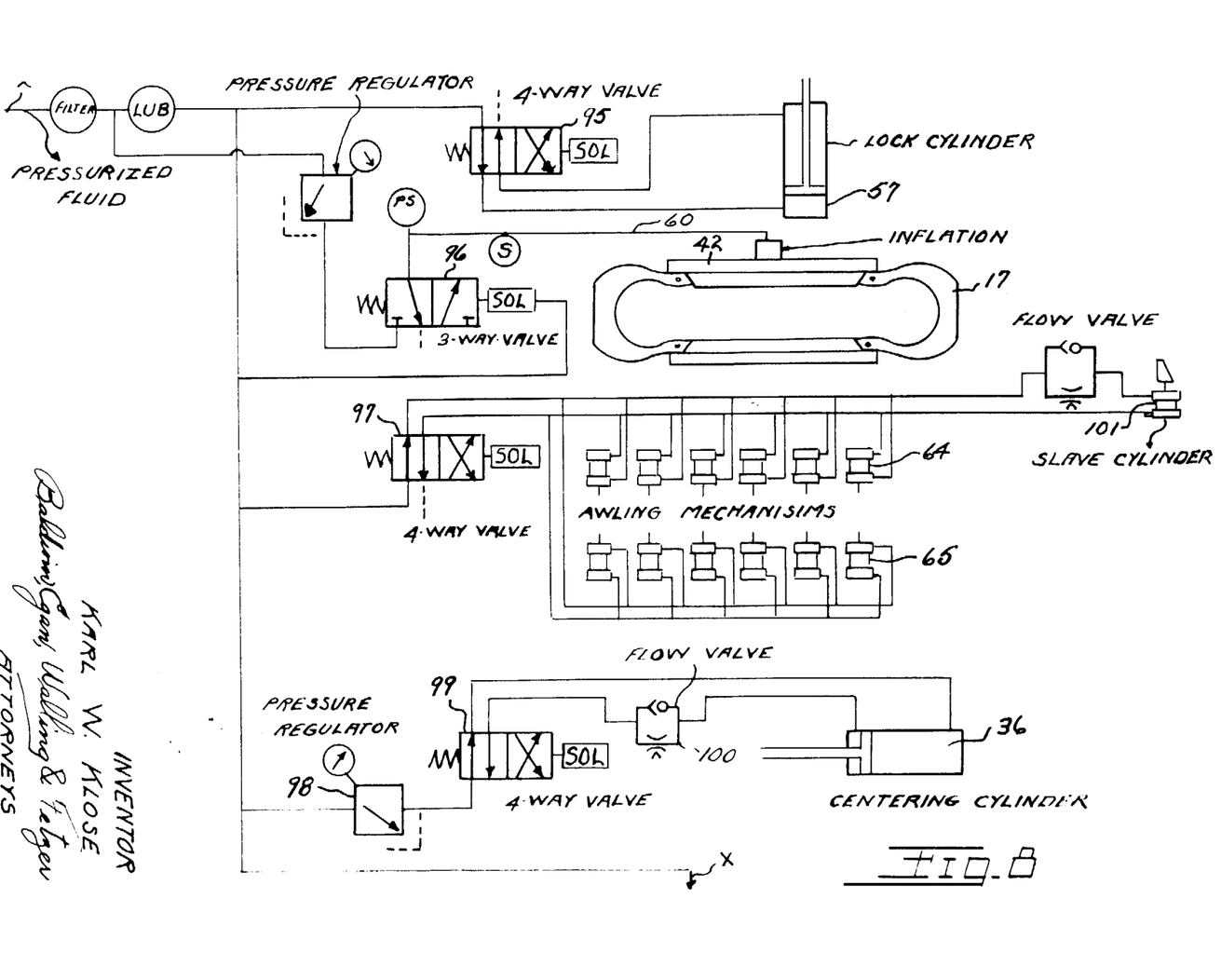
FIG. 8 is a schematic diagram of the flow control valves and associated connections of the apparatus of FIG. 1.

In FIG. 8, pressurized fluid enters the system at "X" and the lock cylinder 57 is controlled by the four-way valve 95. The inflation system including air passageway 60 is controlled by the three-way valve 96. The awling mechanisms 64, 65, etc. are controlled by the four-way valve 97, and the centering cylinder 36 is controlled by the pressure regular 98, the four-way valve 99, and the flow control valve 100.

In operation, a tire is introduced to the conveyor 16 at the front gates 20 and 22 and such gate signals through a photocell for front gate to open. The single tire release mechanism prevents a second tire from following. One only tire is permitted to enter the awling machine. The closed rear gates 80, 82 stop the tire on the gravity conveyor 16 on or about the center of the awling machine. The desired stop position for the tire is adjustable. The presence of the tire activates "tire centering" (32, 33, 34, 35) through a photocell and closes the front gates 20 and 22 again. The lower ring 46 "raise" action is time delayed to give tire ample time to settle and to be centered in the awling machine. At the time the bottom ring 46 contacts the lower bead of the tire, a limit switch closes (it was held open by the bottom ring 46 in the down position) which relaxes and returns the centering rollers 32, 33, 34, 35 and also opens the rear gates 80, 82. Raising the tire against the upper bead ring 42 closes a limit switch which in turn activates the lock solenoid which actuates the lock cylinder 57. The lock signal obtained through closing of a limit switch introduces the inflation air to the tire, which generates a separating force that becomes greater than the lift force produced by cylinder 48 causing the lower ring of ring 46 and ring support 55 and the subsequent engagement of lock pin 53 with the annular groove 56 on the lower ring support 55. Awling is started by a signal from a pressure switch. The pressure is adjustable. Recommended awling pressure for passenger tires is 20 P.S.I. The awling circuit contains an electrical counter for counting the number of awl cycles electrically. The extended piston of the slave awl cylinder 101 closes a limit switch which deenergizes inflation and locking. A timer deenergizes lower ring "raise". The bottom ring 46 and tire 17 are lowered. The tire is stripped from bottom bead ring 46 by the gravity conveyor 16, and the tire is rapidly discharged down the power driven roller conveyor 18. A photocell signals "conveyor clear" which closes the rear gates 80, 82 for cycle repeat. Presence of any tire on the driven conveyor rollers for more than 15 seconds deenergizes the roller drive to prevent marking of the tire. The length of time is selective by setting a timer.

Thus, the invention provides an apparatus for automatically awling tires to relieve trapped air pockets interiorly of the tire casing including feed means in the form of feed conveyor 16 and coacting gates 20, 22 for advancing a tire to the apparatus, horizontal positioning means in the form of the centering rollers 32, 33, 34, 35 for horizontally centering the tire on the apparatus, vertical positioning means in the form of the upper and lower bead rings 42, 46 in conjunction with inclined ribs 50 for vertically positioning the tire on the apparatus after it is horizontally centered and preparatory to inflation, inflating means for inflating the tire preparatory to awling, awling means 64, 65, etc. for awling the inflated tire on at least one side thereof to relieve trapped air therein, deflating means through passageway 60 for deflating the tire, and rapid power driven discharge means in the form of discharge conveyor 18 and its coacting discharge arms 80 and 82 for ejecting the awled tire 17 from the apparatus.

With the apparatus of the invention tire awling is effected consistently, accurately, and inexpensively.

The invention also contemplates the method of awling tires to release trapped air pockets interiorly of the tire casing including inflating the tire to a predetermined pressure, simultaneously awling the tire in a plurality of locations, and deflating the tire. The method of the invention also may include the step of awling the tire on at least one side thereof, or awling the tire at a plurality of locations on both sides of the tire.

I claim:

1. An apparatus for automatically awling tires to relieve trapped air pockets interiorly of the tire casing comprising, feed means for advancing a tire to the apparatus, horizontal positioning means for horizontally centering the tire on the apparatus, vertical positioning means for vertically positioning the tire on the apparatus after it is horizontally centered and preparatory to inflation, inflating means for inflating the tire preparatory to awling, awling means for awling the inflated tire on at least one side thereof to relieve trapped air therein, deflating means for deflating the tire, quick discharge means for ejecting the awled tire from the apparatus, locking means for locking the upper and lower bead rings in predetermined spaced relation with the tire in sealed relation therebetween preparatory to inflation, said locking means including a vertically disposed lock shaft positioned in the top of the apparatus and extending centrally upward through the upper bead ring, said lock shaft having a lock key secured to its lower end, said lower bead ring including a lower bead ring support having an annular groove for receiving said lock key in locking relation therein after the lower bead ring is raised to clamp the tire against the upper bead ring following the locking of the upper and lower bead rings in predetermined spaced relation.

2. An apparatus for automatically awling tires to relieve trapped air pockets interiorly of the tire casing comprising, feed means for advancing a tire to the apparatus, horizontal positioning means for horizontally centering the tire on the apparatus, vertical positioning means for vertically positioning the tire on the apparatus after it is horizontally centered and preparatory to inflation, inflating means for inflating the tire preparatory to awling, awling means for awling the inflated tire on at least one side thereof to relieve trapped air therein, deflating means for deflating the tire, and quick discharge means for ejecting the awled tire from the apparatus, said discharge means being a power-driven, roller type discharge conveyor, and further including a pair of spaced, coacting, hydraulically controlled, rear stop gate arms disposed at the sides of the discharge conveyor adjacent the inner end thereof, said rear stop gate arms being horizontally rotatable in coacting timed sequence to and from a position adjacent the inner end of the discharge conveyor to retain a tire thereat prior to centering.

3. An apparatus for automatically awling tires comprising, a base, a pair of spaced upstanding columns extending upwardly from said base, an inclined, gravity-type tire roller conveyor system disposed between and secured to said columns intermediate the ends thereof including a feed conveyor and a discharge conveyor for feeding and discharging tires from the apparatus in preselected sequence, a pair of spaced coacting hydraulically controlled single tire release gates disposed at the sides of the feed conveyor and configured and adapted to retain and release one tire at a time on such feed conveyor, said release gates being horizontally rotatable in coacting timed sequence to and from a position over the feed conveyor to retain and release one tire at a time thereon in preselected sequence, whereby a released tire rolls down the feed conveyor by gravity to the inner end of such feed conveyor, two pair of oppositely and horizontally spaced centering rollers disposed adjacent the sides of the inner end of the feed conveyor and movably mounted for displacement toward and away from each other to center a tire therebetween, a stationary upper tire bead ring secured to and interposed between the spaced columns above the conveyor system, a vertically movable lower bead ring disposed below the tire when it is in position at the inner end of the feed conveyor, said lower bead ring being movable vertically so as to lift the tire and clamp it against the upper bead ring preparatory to inflation, a vertically disposed lock shaft extending centrally through the upper bead ring, said lock shaft having a lock key secured to its lower end, said lower bead ring including a lower bead ring support having an annular groove receiving said lock key in locking relation therein when the lower bead ring is raised to clamp the tire against the upper bead ring thereby locking the upper and lower bead rings and moving the same into a predetermined spaced relation with the tire therebetween through the introduction of inflation air, said lock shaft having an air passageway formed longitudinally therein with the inner end of the passageway opening into the interior of the tire when it is clamped between the bead rings and the other end of the passageway being connected to an associated source of compressed air to inflate the tire, a plurality of hydraulically actuated awling mechanisms disposed in spaced operative relation on the periphery of the bead rings for awling the sides of the tire to a predetermined depth when the tire is inflated, and a pair of spaced coacting hydraulically controlled rear stop gate arms disposed at the sides of the discharge conveyor adjacent the inner end thereof, said rear stop gate arms being horizontally rotatable in coacting timed sequence to and from a position adjacent the inner end of the feed conveyor to retain a tire thereat.

* * * * *